United States Patent
Weinsberg

(10) Patent No.: US 9,515,992 B2
(45) Date of Patent: Dec. 6, 2016

(54) NETWORK ENVIRONMENT SEPARATION

(75) Inventor: Udi Weinsberg, Ashdod (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 14/240,863

(22) PCT Filed: Aug. 22, 2012

(86) PCT No.: PCT/IL2012/050321
§ 371 (c)(1),
(2), (4) Date: Nov. 6, 2014

(87) PCT Pub. No.: WO2013/027218
PCT Pub. Date: Feb. 28, 2013

(65) Prior Publication Data
US 2015/0052600 A1 Feb. 19, 2015

(30) Foreign Application Priority Data
Aug. 25, 2011 (IL) .......................................... 214830

(51) Int. Cl.
*H04L 29/00* (2006.01)
*H04L 29/06* (2006.01)
*H04L 12/46* (2006.01)
(52) U.S. Cl.
CPC ....... *H04L 63/0245* (2013.01); *H04L 12/4641* (2013.01); *H04L 63/0209* (2013.01)
(58) Field of Classification Search
CPC .................................................... G06F 15/177
USPC ........................................................ 726/13
See application file for complete search history.

(56) References Cited

U.S. PATENT DOCUMENTS

| 2002/0091795 | A1 | 7/2002 | Yip et al. |
| 2003/0120763 | A1* | 6/2003 | Volpano ........................ 709/223 |
| 2006/0294297 | A1 | 12/2006 | Gupta |
| 2010/0306408 | A1 | 12/2010 | Greenberg et al. |

FOREIGN PATENT DOCUMENTS

| EP | 1585261 A1 | 10/2005 |
| WO | 02079949 A2 | 10/2002 |
| WO | 2004094324 A1 | 11/2004 |
| WO | 2009039374 A1 | 3/2009 |

OTHER PUBLICATIONS

Hewlett-Packard Developement Company/ HP Virtual Connect traffic flow / 2011 / Hewlett-Packard/ pp. 1-22.*

* cited by examiner

*Primary Examiner* — Michael D Anderson
(74) *Attorney, Agent, or Firm* — Browdy and Neimark, PLLC

(57) ABSTRACT

The presently disclosed subject matter includes, inter alia, a separation module being operatively connectible to a network device operable to facilitate data communication in a communication network, the separation module being configured to control data communication in the communication network, the separation module being assigned with a network-id associating the separation module with a given network environment; the separation module being further configured to tag a data packet received by the network device from a first direction, in order to associate the data packet with a given network environment; and determine whether a tag, associated with a data packet received by the network device from a second direction, is compatible with the assigned network-id, and if it is, remove the tag from the data packet and allow transmission of the data packet.

19 Claims, 11 Drawing Sheets

NETWORK ENVIRONMENT SEPARATION

FIELD OF THE PRESENTLY DISCLOSED SUBJECT MATTER

This invention relates to the field of information security and more particularly to the field of network environment separation.

BACKGROUND

Separating between groups of nodes within a communication network, where each group constitutes a separated network environment, is becoming a key element in the field of information security. Consider for example the network architecture illustrated in FIG. 1, which shows two Local Area Networks LAN1 and LAN2 (LAN—local area network) that are connected over an encrypted Virtual Private Network (VPN) tunnel, established by two access routers (R1 and R2). LAN1 and LAN2 can represent, for example, local area networks of the same organization, which are located at different locations on the globe. As can be seen in FIG. 1 routers R1 and R2 on either sides of the network are connected each to a number of nodes. The nodes in LAN1 and LAN2 are divided into departments, department A (e.g. engineering) and department B (e.g. accounting). The nodes which are assigned to department A in both LAN1 and LAN2 constitute a first network environment and the nodes which are assigned to department B in both LAN1 and LAN2 constitute a second network environment.

For various reasons it is often advantageous to maintain a clear separation between different departments in the same organization and establish separate network environments, which prevent unauthorized data transfer from one environment to the other. However, while data which is being transferred from one LAN to another can be encrypted, once the data enters the internal domain of the target LAN it is decrypted and becomes vulnerable to access by unauthorized environments.

Published references considered to be relevant as background to the presently disclosed subject matter are listed below. Acknowledgement of the references herein is not to be inferred as meaning that these are in any way relevant to the patentability of the presently disclosed subject matter.

IEEE Standard for Local and metropolitan area networks Virtual Bridged Local Area Networks: IEEE Std 802.1Q™-2005, IEEE Std 802.1Q-1998, IEEE Std 802.1u™-2001, IEEE Std 802.1v™-2001, and IEEE Std 802.1s™-2002.

SUMMARY

According to an aspect of the presently disclosed subject matter there is provided a separation module: the separation module being operatively connectible to a network device operable to facilitate data communication in a communication network, the separation module being configured to control data communication in the communication network, the separation module being assigned with a network-id associating the separation module with a given network environment; the separation module being further configured to: tag, with the help of the network-id, a data packet received by the network device from a first direction, in order to associate the data packet with the given network environment; and determine whether a tag, associated with a data packet received by the network device from a second direction, is compatible with the assigned network-id, and if it is, remove the tag from the data packet and allow transmission of the data packet.

According to certain embodiments of the presently disclosed subject matter, the separation module is an internal separation module, wherein the first direction is an uplink direction towards the network device and the second direction is a downlink direction away from the network device.

According to certain embodiments of the presently disclosed subject matter, the separation module is an external separation module, wherein the first direction is a downlink direction away from the network device and the second direction is an uplink direction towards the network device.

According to certain embodiments of the presently disclosed subject matter, the separation module comprises a direction determination module configured to adapt the separation module to match one of a first directionality or a second directionality, wherein in the first directionality the first direction is an uplink direction towards the network device and the second direction is a downlink direction away from the network device, and in the second directionality the first direction is a downlink direction away from the network device and the second direction is an uplink direction towards the network device.

According to certain embodiments of the presently disclosed subject matter, the tag is applied to a payload of the data packet.

According to certain embodiments of the presently disclosed subject matter, the separation module according to claim 1 further comprising:

a data-repository for storing the network-id and a processor associated with a tagging module configured to perform the tagging; and a validation module configured to determine whether the tag is compatible with the separation module.

According to certain embodiments of the presently disclosed subject matter, the separation module is incorporated in a security manager; the security manager operatively connected to a network device and to an external network, and being operable to control transmission of data between the network device and the external network; the security manager comprises or otherwise associated with a data repository configured for storing network-ids; the separation module is configured to: receive a data packet, sent via an external separation module in the network device; the data packet comprising a first tag and a second tag; determine whether the second tag, associated with the data packet, is compatible with any one of network-ids stored in the data repository; if it is, remove the tag from the data packet; and determine whether the first tag, associated with the data packet, is compatible with any one of network-ids stored in the data repository; if it is, remove the tag from the data packet; and allow the transmission of the data packet to the external network.

According to another aspect of the presently disclosed subject matter there is provided a network device configured to control communication of data between nodes associated with one or more network environments; the network device comprising: at least a first separation module and a second separation module, the first separation module being operationally connected to a first node connected to the network device; the first separation module is configured to tag a data packet received from the first node, with the help of a network-id assigned to the first separation module, the tag being indicative of a respective network environment of the first node; and transmit the data packet towards the second separation module.

According to certain embodiments of the presently disclosed subject matter, the second separation module is associated with a second node connected to the network device; the second separation module is configured to: receive the data packet; determine whether the tag associated with the data packet is compatible with the second separation module; and if it is, remove the tag from the data packet and allow transmission of the data packet to the second node.

According to certain embodiments of the presently disclosed subject matter, the second separation module is an external separation module associated with an external communication network connecting the network device to a second network device; the external separation module is configured to: tag the data packet received from the first separation module, with a second tag, the second tag being indicative of a respective network environment of the network device; and transmit the data packet towards the second network device.

According to another aspect of the presently disclosed subject matter, secure small form-factor pluggable transceiver (SFP) comprising the separation module described above, the SFP being operatively connectible to a network device to facilitate data communication with the network device in a communication network.

According to another aspect of the presently disclosed subject matter there is provided a method of controlling transmission of data in a communication network, the method comprising:

tagging, a data packet received by a network device from a first direction in the communication network; the tagging is performed with the help of a network-id assigned to the network device, the network-id is indicative that the data packet is associated with a given network environment; and determining whether a tag associated with a data packet, received by the network device from a second direction, is compatible with a network-id assigned to a target device, and if it is, removing the tag from the data packet and allowing transmission of the data packet to the target device.

According to certain embodiments of the presently disclosed subject matter, the first direction is an uplink direction towards the network device and the second direction is a downlink direction away from the network device.

According to certain embodiments of the presently disclosed subject matter, the first direction is a downlink direction away from the network device and the second direction is an uplink direction towards the network device.

According to certain embodiments of the presently disclosed subject matter, wherein the network device is connected to a first node and a second node, the method comprising: performing the tagging on a data packet received from a first node connected to the network device; and performing the determining on the data packet being transmitted to a second node connected to the network device; thereby controlling transmission of data between the first node and the second node.

According to another aspect of the presently disclosed subject matter, there is provided a method of controlling transmission of data in a communication network via a network device, the method comprising: receiving from a first node connected to the network device a data packet destined to a second node connected to a second network device; the network and the second network device are connected over a communication network; tagging the data packet received from the first node with a tag being indicative of a respective network environment of the first node; tagging the data packet with a second tag being indicative of a respective network environment of the network device; and transmitting the data packet to the second network device via the communication network; thereby enabling the second network device to determine whether to allow transmission of the data packet.

According to certain embodiments of the presently disclosed subject matter, The method further comprising: receiving a data packet from the second network device destined to a node connected to the network device; the data packet comprising a first tag and a second tag; in case the second tag, associated with the data packet, is compatible with the network device: removing the tag from the data packet; in case the first tag, associated with the data packet, is compatible with the node: removing the tag from the data packet; and allowing transmission of the data packet to the node.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
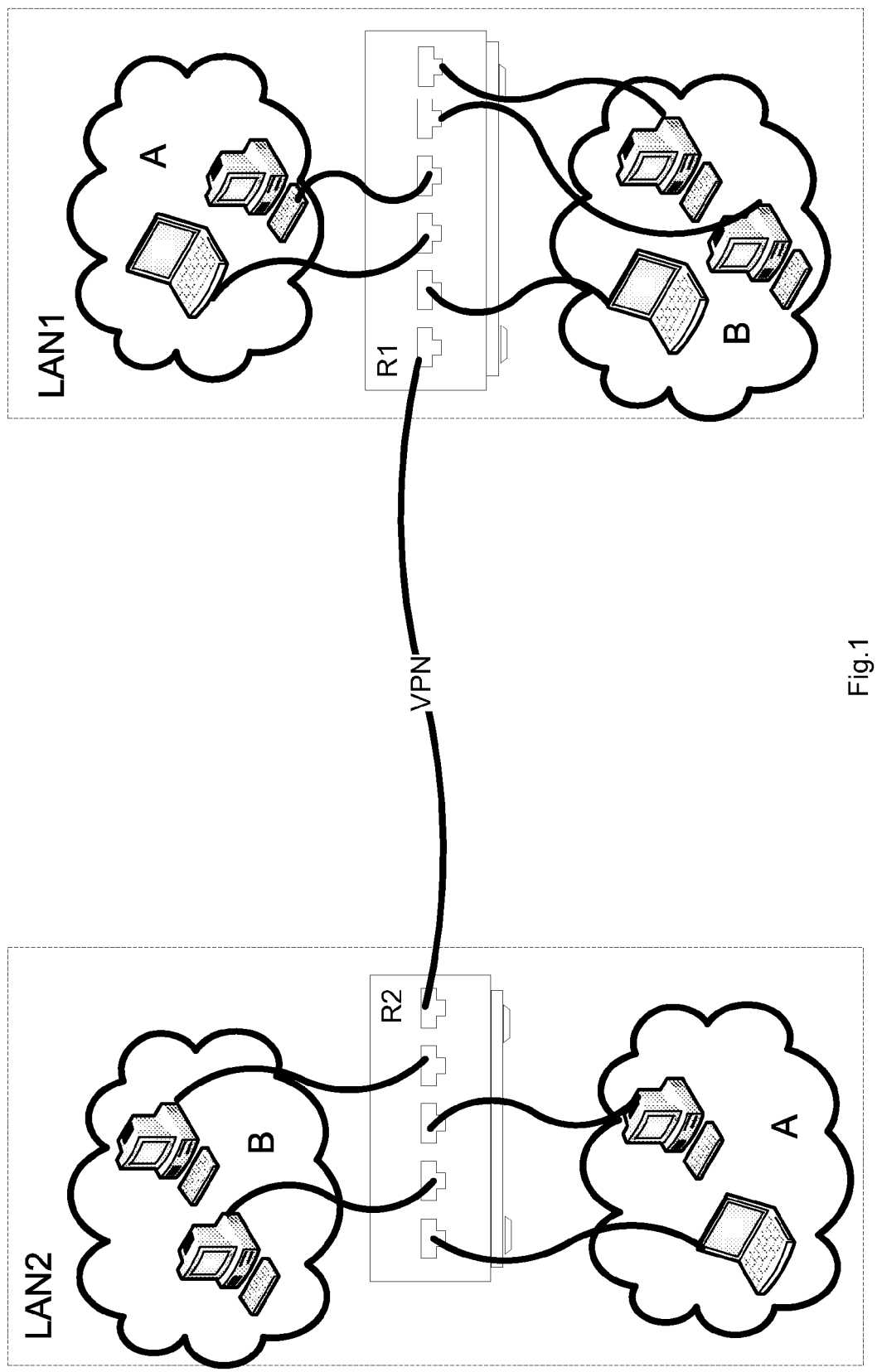
FIG. 1 is a block diagram schematically illustrating an example of network architecture as known in the art.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "controlling", "tagging", "allowing", "validating", "determining" or the like, include action and/or processes of a computer that manipulate and/or transform data into other data, said data represented as physical quantities, e.g. such as electronic quantities, and/or said data representing the physical objects.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, fewer, more and/or different stages than those shown in FIG. 5, FIG. 7, FIG. 9 and FIG. 11 may be executed. In embodiments of the presently disclosed subject matter one or more stages illustrated in FIG. 5, FIG. 7, FIG. 9 and FIG. 11 may be executed in a different order and/or one or more groups of stages may be executed simultaneously. FIG. 2, FIG. 3, FIG. 4, FIG. 6, FIG. 8 and FIG. 10 illustrate a general schematic of the system and/or network architecture in accordance with an embodiment of the presently disclosed subject matter. Modules in FIG. 2, FIG. 3, FIG. 4, FIG. 6, FIG. 8 and FIG. 10 can be made up of any combination of software, hardware and/or firmware that performs the functions as defined and explained herein. The modules in FIG. 2, FIG. 3, FIG. 4, FIG. 6, FIG. 8, and FIG. 10 may be centralized in one location or dispersed over more than one location. In other embodiments of the presently disclosed subject matter, the system may comprise fewer, more, and/or different modules than those shown in FIG. 2, FIG. 3, FIG. 4, FIG. 6, FIG. 8, and FIG. 10.

As mentioned above it is often desirable to create segregated network environments within an organization and thus prevent unauthorized data transfer between different nodes within the organization which are assigned to different network environments. To this end, the teachings of the presently disclosed subject matter includes a secure network separation module which can be incorporated within a network device and which can control transmission of data between different network environments. The secure network separation module disclosed herein is adapted to enable the validation of data packets which are transmitted between different nodes and thereby restrict the unauthorized transmission of data packets between different network environments. The secure network separation module (or in short "separation module") of the presently disclosed subject matter can be incorporated as part of network devices (such as switches, routers, media converters, advanced telecommunication cards (ATC), etc.) and be configured as a designated programmable module which is write-protected and can be accessed and altered in a secured manner, only by authorized personnel and with special equipment. Particularly, it is configured to be protected from modification of its preprogrammed parameters by remote access via the associated network.

For example, a separation module can be manufactured as a write protected memory device such as a one-time programmable non-volatile memory (OTP NVM) with a high-speed programmable logic (depending on the SFP bandwidth). Alternatively, a separation module can be a reprogrammable memory device which applies a stringent write-protection mechanism, for example a programmable FPGA that only accepts an encrypted binary with a pre-loaded (and burnt) key.

The separation module can be incorporated within a small form-factor pluggable (SFP) transceiver to create a secure SFP. In general an SFP can be plugged into a standard SFP-enabled network device, and used to interface the network device with a fiber optic or copper networking cable to facilitate communication between different nodes in a network. The secure SFP disclosed herein is adapted to facilitate the functionality of the separation module and enable the validation of data packets which are transmitted between different nodes and thereby restrict the unauthorized transmission of data packets between different network environments. The secure SFP can maintain the core structure of previously known SFPs and is therefore compatible with existing network infrastructure equipment.

In the following discussion the presently disclosed subject matter is described with reference to a secure SFP. However, it should be noted that a secure SFP is a non-limiting example and the presently disclosed subject matter contemplates other implementations of a separation module, for example, in a printed circuit board which can be integrated as part of the network device's motherboard.

It should be also noted that although some aspects of the presently disclosed subject matter are described with reference to wired communication networks, this should not be construed as limiting and the presently disclosed subject matter can be implemented in a wired or wireless communication network and is not limited to any specific type of communication network or protocol.

Figure 2:
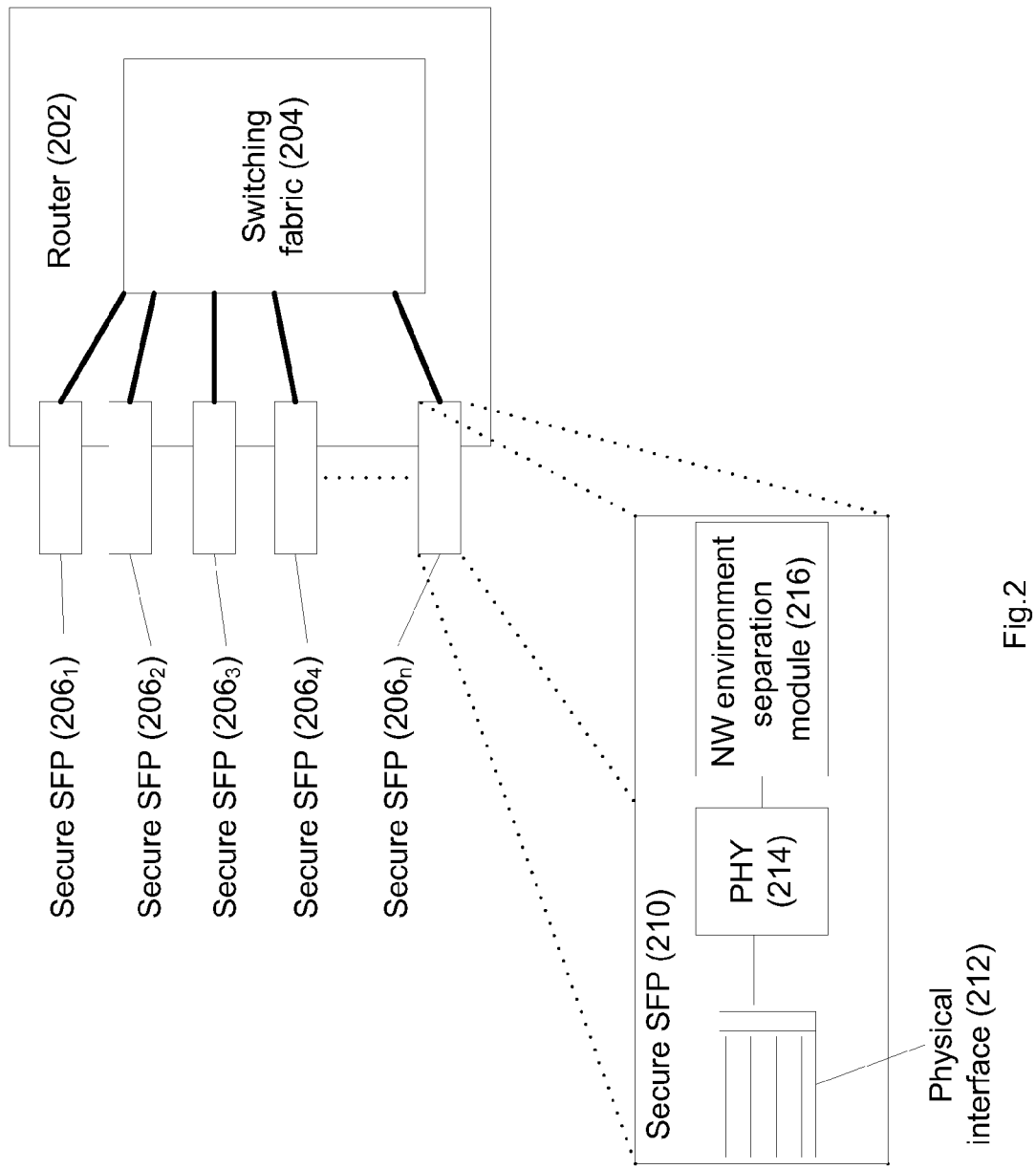
FIG. 2 is a functional block diagram schematically illustrating a router and a secure SFP transceiver, in accordance with the presently disclosed subject matter.

FIG. 2 is a block diagram schematically illustrating a router and a secure SFP transceiver, in accordance with the presently disclosed subject matter. FIG. 2 shows router 202 comprising a switching fabric 204 adapted to interconnect and enable data transmission between plurality of secure SFPs ($206_{1-n}$), which are connected to router 202. FIG. 2 also shows a detailed view of one secure SFP 210. Secure SFP 210 comprises a physical interface 212 for physically connecting with an input cable and receiving incoming communication. Physical interface is connected to Phy 214 which can be configured for example to perform analog to digital and digital to analog conversion of incoming and outgoing communication signals, respectively.

According to the presently disclosed subject matter, SFP 210 further comprises a network environment separation module 216 (or in short "separation module") which is configured to control data transmission through SFP 210. To this end, separation module 216 is preprogrammed with a "network-id" that identifies secure SFP 210 and assigns it to a certain network environment.

Separation module 216 is configured to receive data packets sent by a node to router 202 (uplinked data packets which are sent in the direction of the switching fabric) and based on its respectivenetwork-id, tag the data packet in order to indicate the respective network environment of the node. Separation module 216 is further configured to receive data packets transmitted in the opposite direction i.e. from router 202 (down-linked data packets which are sent away from the switching fabric) and validate, again based on it respective network-id, that the data packets are being transmitted between nodes that are assigned to the same network environment.

In case the tag of a down-linked data packet matches the network-id assigned to the receiving SFP, this means that the node that transmitted the data is assigned to the same network environment assigned to the receiving SFP, and accordingly separation module 216 allows the transmission of the data packet to the requested target. Otherwise, in case the tag of a down-linked data packet does not match the network-id which is assigned to the receiving SFP, this means that the node which transmitted the data and the receiving SFP are assigned to different network environment and accordingly separation module 216 denies transmission of the data packet. The data packet can be discarded or saved for monitoring purposes.

The specific location of separation module 216 within secure SFP 210 may vary, for example in case secure SFP 210 comprises a network interface card (NIC) for storing a MAC address, separation module 216 can be located before or after the NIC card. However, in order to enable to control the transmission of data to the switching fabric, separation module 216 is located before the switching fabric.

Figure 3:
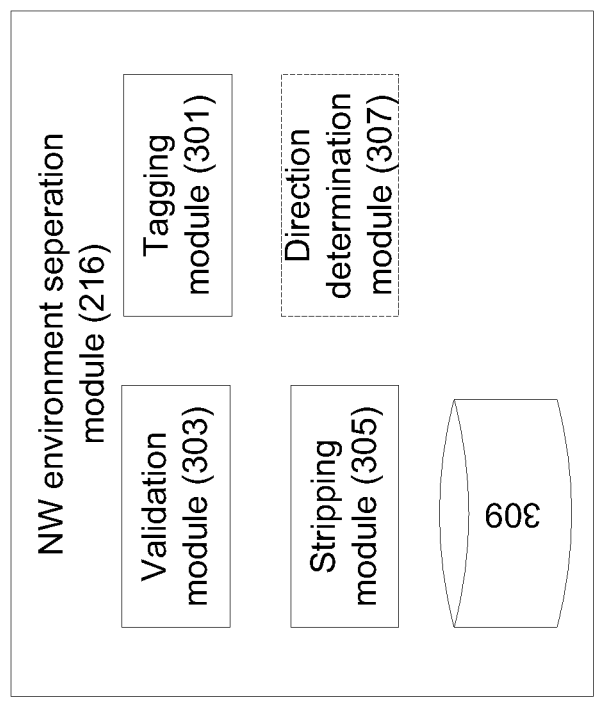
FIG. 3 is a functional block diagram schematically illustrating a network environment separation module, in accordance with the presently disclosed subject matter.

FIG. 3 is a functional block diagram schematically illustrating a network environment separation module, in accordance with the presently disclosed subject matter. According to the example illustrated in FIG. 3 network environment separation module 216 comprises a tagging module 301, a validation module 303 and a stripping module 305. Separation module 216 can also comprise a non-volatile computer memory 309 for storing its network-id. In some cases separation module 216 can further comprise a direction determination module 307. In some configuration different modules described herein with reference to separation module 216 can be distributed into separate units. Thus, for example, tagging module 301 can be configured in one unit and validation module 303 and stripping module 305 can be configured in a second unit. Separation module 216 can be associated with a processor (e.g. located in SFP 210) to obtain processing capabilities. A more detailed description of the operations of the different modules in separation module 216 is provided below with reference to FIG. 5.

Figure 4:
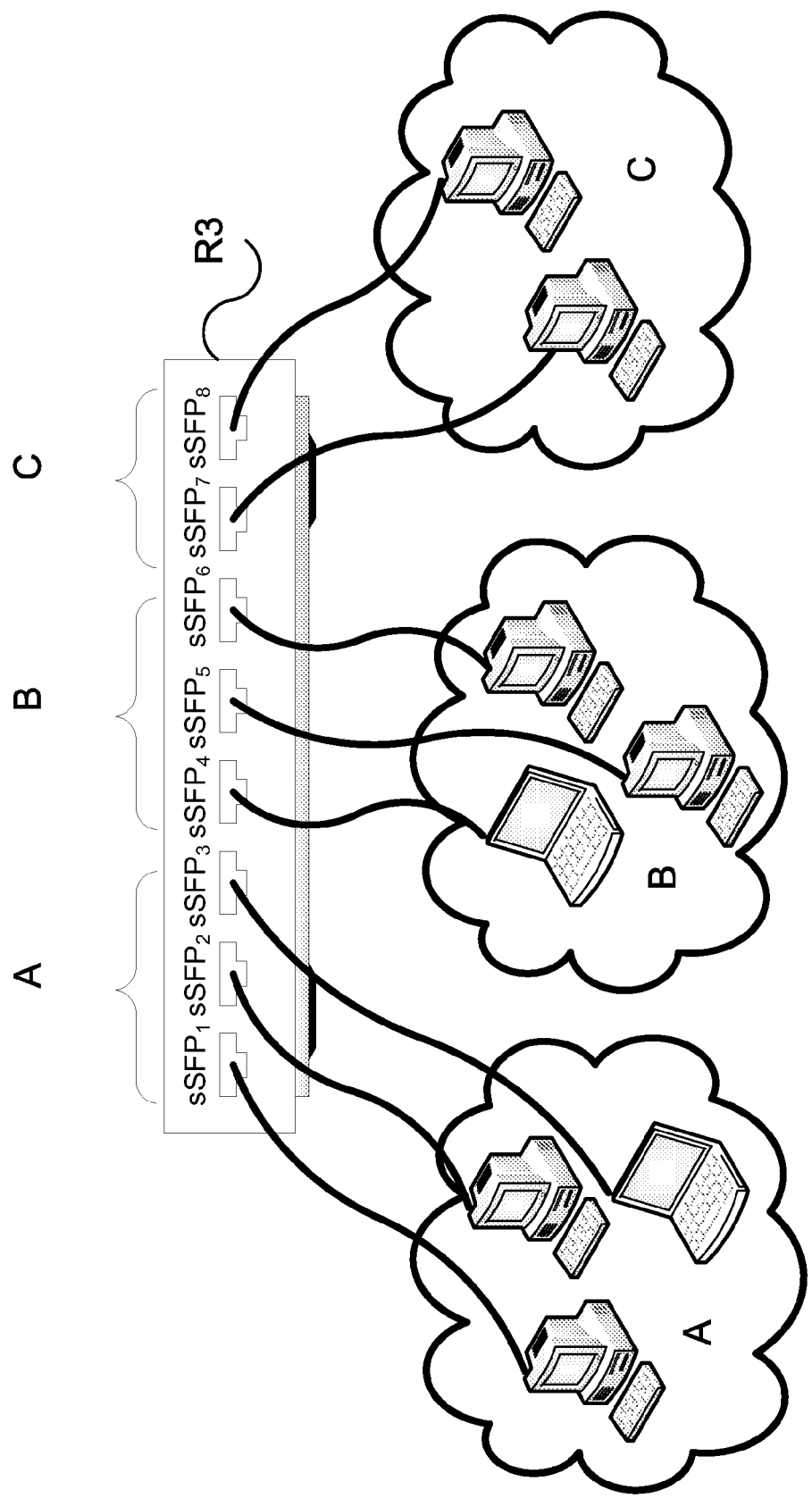
FIG. 4 is a functional block diagram schematically illustrating network architecture in accordance with the presently disclosed subject matter.

FIG. 4 is a functional block diagram schematically illustrating network architecture in accordance with the presently disclosed subject matter. The network architecture which is illustrated comprises a single router R3 connected to a plurality of nodes (e.g. computer terminals, computer servers, computer facilities such as printers or fax machines, etc.). The nodes which are connected to router R3 are assigned to different groups (denoted by the letters A, B and C) each group constituting a different network environment. As mentioned above each group of nodes can correspond, for example, to a different department in the same organization.

As can be seen in FIG. 4 each node is connected to a respective secure SFP port in router R3. In some cases instead of directly connecting each node to router R3, part or all of the nodes assigned to the same group can first be connected to one or more intermediate routers which in turn can be connected to router R3. In addition, it should be noted that instead of a single router (router R3) as disclosed in FIG. 4, multiple interconnected routers can be used.

Router R3 is configured in accordance with the teachings of the presently disclosed subject matter to obtain network environment separation and avoid data transfer between nodes which are assigned to different groups. Secure SFP ports (sSFP$_{1-8}$) are configured with separation module 216 as described above.

Figure 5:
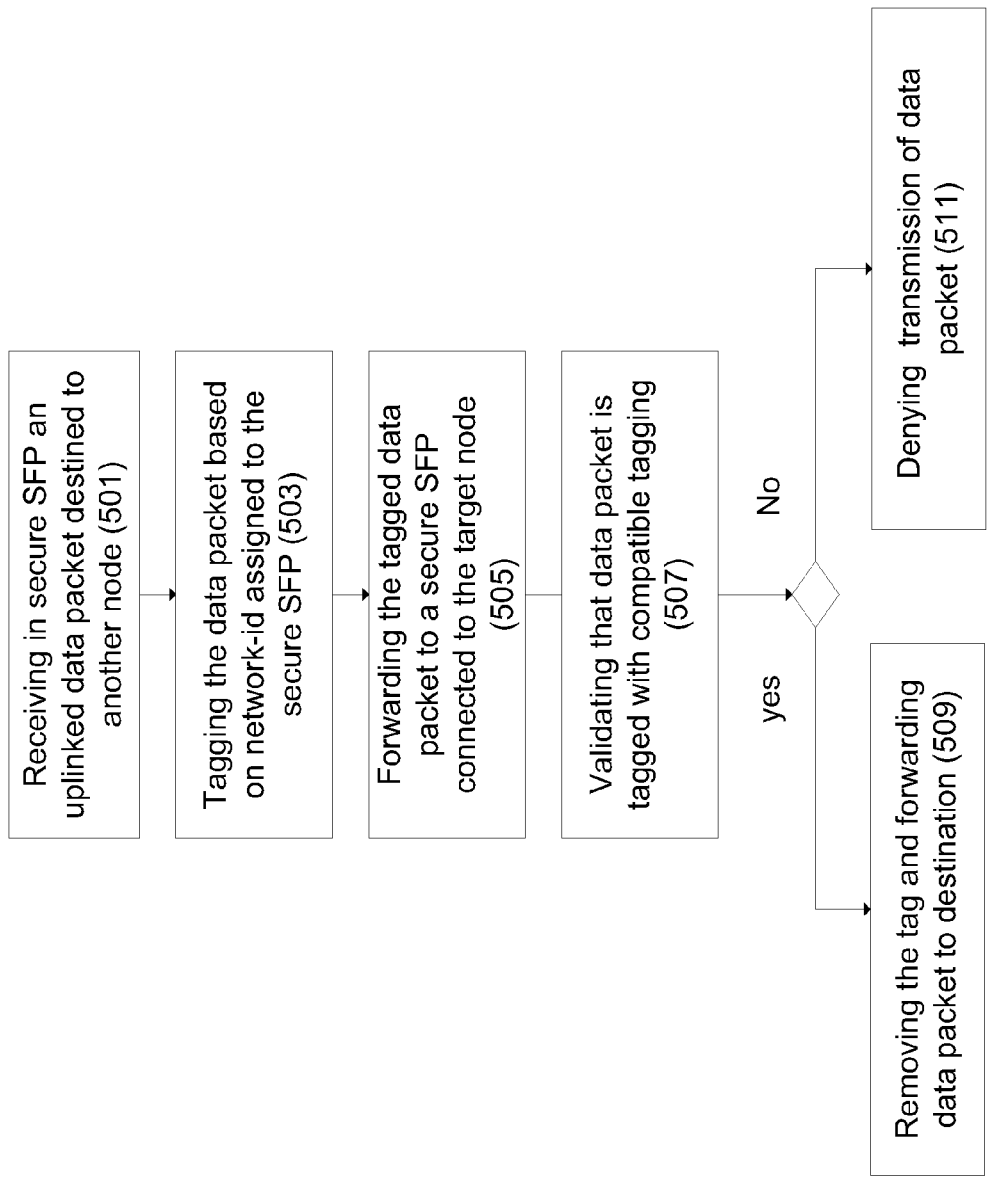
FIG. 5 is a flowchart illustrating operations performed in accordance with the presently disclosed subject matter.

FIG. 5 is a flowchart illustrating operations performed in accordance with the presently disclosed subject matter. The operations in FIG. 5 are described with reference to the network architecture presented in FIG. 4. Consider for example communication of data from a first computer terminal connected to router R3 to a second computer terminal connected to router R3. Initially data packets are transmitted from the first computer terminal to a secure SFP 210 (say SFP$_1$) in router R3 to which the first computer is connected.

At block 501 a data packet is received in SFP$_1$. As explained above, in order to enable network environment separation between different groups of nodes, each group is assigned with a different network-id that enables to differentiate between data packets transmitted by nodes of different groups. Once the data packet is received in separation module 216 within SFP$_1$ the uplinked data packed is tagged with the help of a network-id which is assigned to the respective network environment of the transmitting node (in this case the network-id which is assigned to group A) (block 503). The network-id can be, stored for example, in SFP$_1$ (e.g. in data-repository 309) which connects the transmitting computer to router R3.

The data packet comprises a payload and a header where the payload is the actual data and the header carries metadata which includes the destination and source of the data packet. According to the presently disclosed subject matter, the payload of the data packet can be tagged while the header remains unchanged.

The tagging of an uplinked data packet can be performed by tagging module 301. Different types of network-ids and different methods can be used for tagging the data packet. For example, a network-id can be a designated header (e.g. the VLAN standard header (802.1Q) can be used for tagging the data packet which is 4 bytes long), wherein the data packet can be tagged by adding the designated header to the payload. In some cases instead or in addition, the data packet can be tagged with the help of a weak encryption (e.g. the network-id being a weak One-Time-Pad encryption with a fixed key) or a strong encryption (by using a strong encryption model with a matching key).

Once the uplinked data packet is tagged by separation module 216 it is forwarded to switching fabric 202 in router R3 where it is routed to the secure SFP connecting the target computer terminal to router R3 (block 505). Routing can be accomplished based on the information in the data packet header which is left unmodified.

Separation module 216 in the receiving secure SFP is configured to validate that the tag of the data packet is compatible with the network-id which is preprogrammed in the receiving secure SFP (block 507) and as mentioned above identifies the network environment of to the receiving secure SFP. Validation of the tagging of the data packet can be performed by validation module 303 in separation module 216.

In some scenarios a single network environment can be allowed to communicate with several different other network environments (referred herein as "affiliated network environments"). In such cases a single separation module 216 can be configured to allow the transmission of data arriving from a plurality of different network environments. As each network environment can be assigned with a predefined network-id, a single separation unit 216 can be provided with information in respect of the affiliated network environments. To this end, data repository 309 can store a list of network-ids assigned to the affiliated network environments. Validation module 303 can be configured, during the validation stage (block 507), to determine whether tagging of the data packet is compatible with any one of the network-ids of the affiliated network environments, which are stored in data-repository 309. In cases where the tag of an incoming data packet is compatible with one of the network-ids stored in data repository 309, the communication of the data packet is allowed.

The manner of validation is dependent on the type of tagging which is used. For example in cases where a designated header has been added to the payload, validation module 303 can simply compare between the designated header attached to the packet and the header which is expected by the receiving secure SFP.

In cases where tagging is more complex, such as some type of encryption, validation module 303 can be configured to check for example, whether the encryption key which is used, is the same encryption key that was assigned to the receiving secure SFP. For example, validation of the data can be performed by attempting to decrypt the encrypted payload. In such cases, separation module 216 can be configured to attempt to decrypt the encrypted payload. In cases where the decryption is successful, the transmission is allowed, and in cases where the decryption fails, transmission of data is denied.

In cases where the validation shows that the tagging of the data packet matches the network-id which is assigned to the receiving SFP (or in some cases any other network-id stored in data repository 309), the tagging is removed and the stripped data packet is transmitted to the target node e.g. the destination computer terminal (block 509). Removal of the tag can be accomplished, for example, with the help of stripping module 305 in separation module 216 of the receiving secure SFP. Otherwise, if the validation shows that the tagging of down-linked data packet is not compatible with the network-id assigned to the receiving SFP, the data packet data transmission to the target node is denied (block 511).

The mechanism described above with reference to FIG. 5, enables to enforce network environment separation. For example, since network environment separation is maintained by tagging data packets based on a network-id which is embedded within the SFP port and is not based on an identity of a node enclosed in the data packet's header, a deliberate attempt to send data from one node to another node in another network environment by altering the sender's address (i.e., a spoofing attack) would fail.

As mentioned above any reference made in the description to a secure SFP is merely by way of a non-limiting example and the presently disclosed subject matter contemplates other implementations of a separation module, for example, in a printed circuit board which can be integrated as part of the network device's motherboard.

Figure 6:
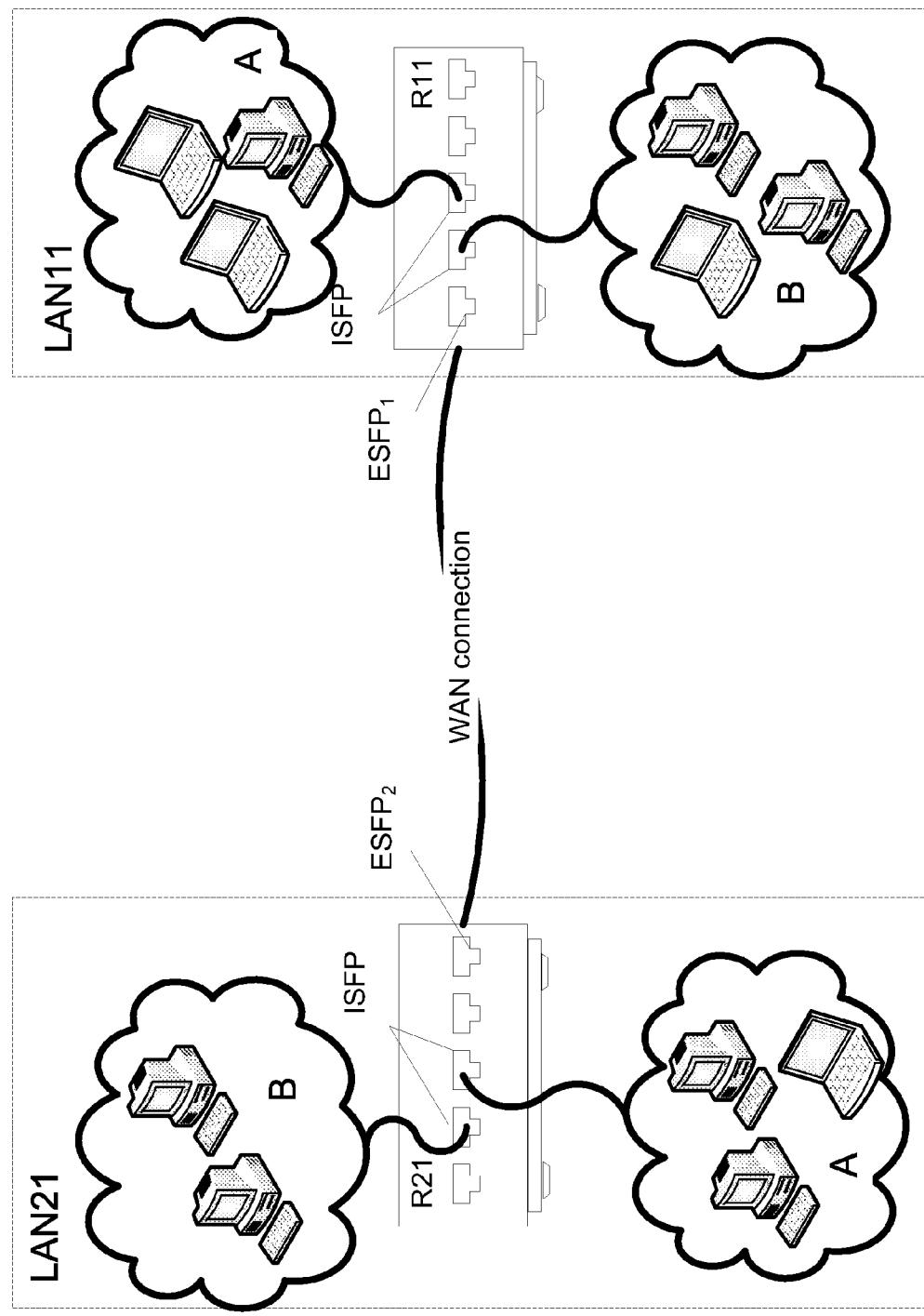
FIG. 6 is a functional block diagram schematically illustrating another network-architecture, in accordance with the presently disclosed subject matter.

FIG. 6 is a functional block diagram schematically illustrating another network-architecture, in accordance with the presently disclosed subject matter. FIG. 6 shows a similar architecture to one presented earlier in FIG. 1. As explained above with reference to FIG. 1, FIG. 6 shows an example of two Local Area Networks LAN11 and LAN21 which are connected over an encrypted VPN tunnel, established by two access routers (R11 and R21). LAN11 and LAN21 can represent for example local area networks of the same organization which are located at different locations on the globe, connected by a wide-area network (WAN). According to the current example, routers R11 and R21 on either sides of the network are connected each to a number of nodes. According to the illustrated example, the nodes in LAN11 and LAN21 are divided into two departments, department A (e.g. engineering) and department B (e.g. accounting).

The nodes in each group can be connected to an intermediate router (not shown) which facilitates the connection to routers R11 and R21. In order to restrict transmission of data between nodes of different groups and maintain network environment separation, SFPs in routers R11 and R21 are secure SFPs configured in accordance with the teachings disclosed herein.

Figure 7:
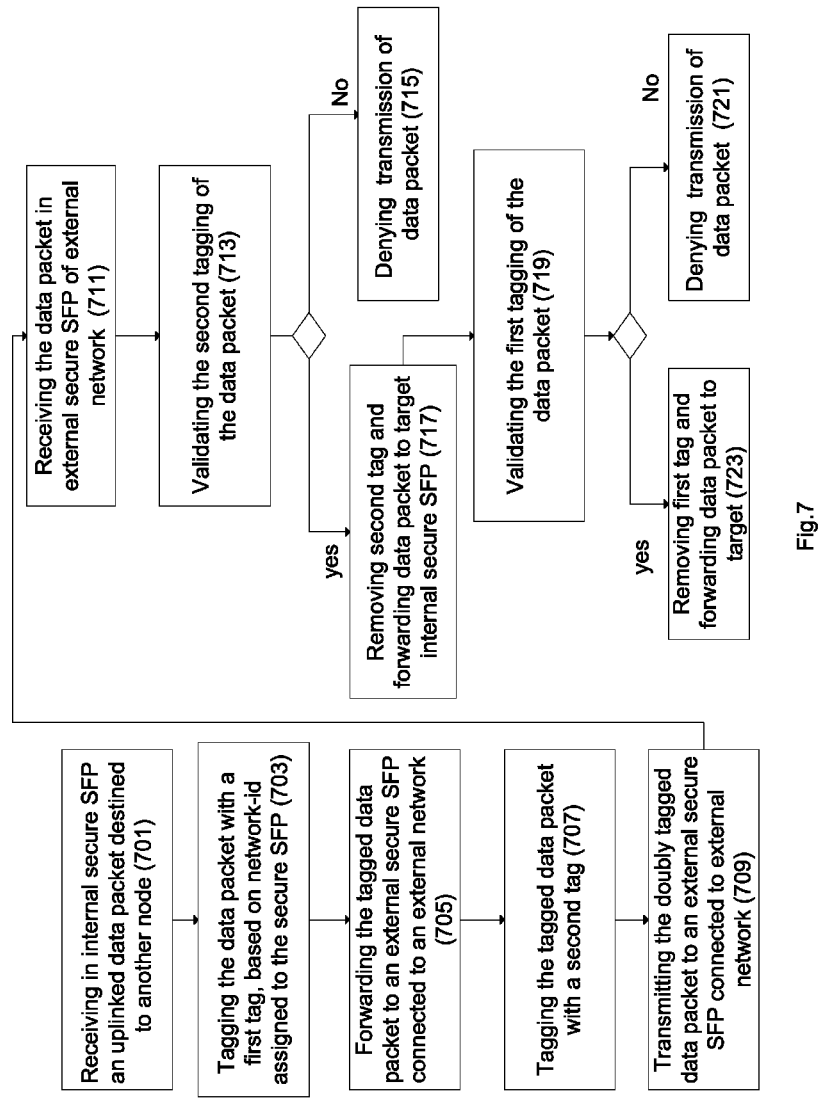
FIG. 7 is a flowchart illustrating operations performed in accordance with the presently disclosed subject matter.

FIG. 7 is a flowchart illustrating operations performed in accordance with the presently disclosed subject matter. The operations in FIG. 7 are described with reference to the network architecture presented in FIG. 6.

Assume for the sake of example that data is being transmitted from a computer terminal (herein "transmitting computer terminal") in group A, in LAN 11 to a computer terminal in LAN21. At block 701 an uplinked data packet is transmitted from the transmitting computer terminal and received by a respective secure SFP 210 in router R11. The uplinked data packet is processed by separation module 216 in secure SFP 210 and the uplinked data packed is tagged with the network-id assigned to that secure SFP 210 (block 703).

As the data packet is targeted to a computer terminal located in another LAN connected over a WAN connection, the data packet is transmitted from the internal secure SFP to an external secure SFP (block 705). As used herein the term "internal secure SFP" refers to a secure SFP which connects between nodes in the same LAN. Internal secure SFP are described above with reference to FIGS. 4 and 5. The term "external secure SFP" refers to a secure SFP which connects between a LAN to an external domain such as another LAN, a public network (e.g. Internet), or any kind of shared resources.

In the current example a first external secure SFP connects router R11 in LAN11 to a WAN (wide area network) connection ($ESFP_1$) and a second external secure SFP connects router R21 in LAN21 to the WAN on the other side ($ESFP_2$). Data packets are forwarded from an internal secure SFP in LAN11 to an external secure SFP connecting router R11 to the external network. Note that data packets which are transmitted to an external secure SFP from an internal secure SFP (down-linked data packets) are already tagged the first time by the internal secure SFP.

At block 707 a down-linked data packed which is received by an external secure SFP ($ESFP_1$) is tagged a second time with a second tagging by the external secure SFP. The second tagging is based on a network-id assigned to the external SFP, and identifies the data packet as a data packet which was sent by an external SFP to an external network. Since the second tagging is assigned only by external secure SFP the data cannot be accessed by other internal SFP unless the second tagging is stripped first. This helps for example to protect against accidental or deliberate transmission of data to the wrong target.

The second tagging can be accomplished for example with the help of an external network-id stored in data-repository 309 accessible to the external secured SFP. After the data is tagged for the second time it is transmitted over the WAN to its destination, in the current example an external secure SFP ($ESFP_2$) in router R21 (block 709).

The transmitted data packet is received at an external secured SFP ($ESFP_2$) in router R21 within LAN21 (block 711) where the receiving SFP is configured to validate the second tag (block 713). In cases where it is determined that the tag of the uplinked data packet is not compatible with the network-id assigned to the external secure SFP ($ESFP_2$) in LAN21, transmission of the data packet is denied (block 715). Otherwise, in cases where it is determined that the tagging of the uplinked data packet is compatible with the external network-id of the external secure SFP ($ESFP_2$), separation module 216 is configured to strip the second tag from the data packet and forward the data packet to its target internal secure SFP, based on the information in the header of the data packet (block 717).

Note that external secure SFPs and internal secure SFPs are configured differently. Although both types of SFPs perform similar operations, the directionality of the operations is inverted. An internal SFP tags uplinked data packets and strips the tag from down-linked data packets. An external secure SFP tags (with a second tag) down-linked data packets and strips the tag from uplinked data packets.

Thus, in accordance with the presently disclosed subject matter, an external secure SFP and an internal secure SFP are configured differently in order to be adapted to their respective functionalities. To this end, separation module 216 can optionally comprise a direction determination module 307. Direction determination module 307 can be configured in accordance with the required functionality of separation module 216 and adapt the directionality of separation module 216.

In addition or instead of a direction determination module 307 two types of separation modules can be manufactured, an internal separation module and an external separation module. Whereas an internal separation module is configured to tag uplinked data packets and strip down-linked data packets, an external separation module is configured to strip uplinked data packets and tag down-linked data packets. An external secure SFP can comprise an external separation module, and an internal secure SFP can comprise an internal separation module.

Reverting to FIG. 7, at block 719 the data packet, now tagged only with a single tagging, is received at the internal secure SFP connected to the target node, where the first tagging of the payload is validated (block 719).

In case the validation shows that tagging of the down-linked data packet is compatible with the one or more network-ids assigned to the internal secure SFP, the tagging is removed and the stripped data packet is transmitted to the target node (block 723). This can be accomplished with the help of stripping module 305 in the receiving internal secure SFP. Otherwise, if the validation shows that the tagging of the incoming data packet is not compatible with the network-id assigned to the receiving internal SFP, transmission of data packet to target node is denied (block 721).

As explained above, in cases where a plurality of affiliated network environments are present, validation module 303 can be configured, during the validation stage (block 713 and block 719), to determine whether tagging of the data packet is compatible with any one of the network-ids of the affiliated network environments, which are stored in data-repository 309. In cases where the tag of an incoming data packet is compatible with one of the network-ids stored in data repository 309 the communication of the data packet is allowed.

Figure 8:
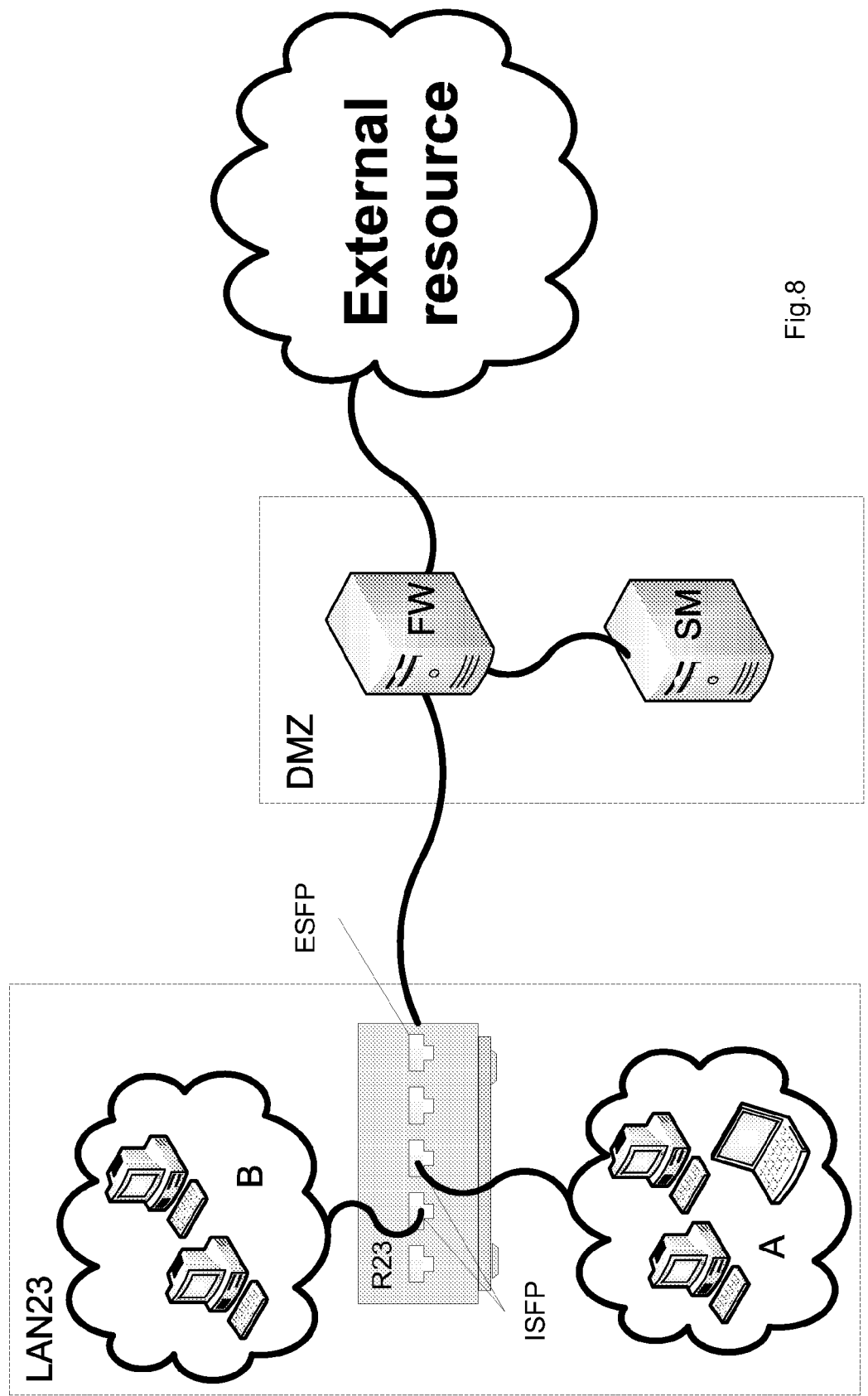
FIG. 8 is a functional block diagram schematically illustrating another network-architecture, in accordance with the presently disclosed subject matter.

FIG. 8 is a block diagram schematically illustrating another type of network architecture, in accordance with the presently disclosed subject matter. FIG. 8 shows LAN (LAN23) divided into two groups, group A and group B which are both connected to router R23. Router R23 is connected to a de-militarized zone (DMZ) via a firewall FW. FW is also connected to security manager SM located within the DMZ and to some type of an external shared resource such as a public network (e.g. the Internet), or a shared printer or fax machine.

Firewall FW is configured for adding an additional layer of security between the local area network of the organization and an unreliable external resource. Firewall FW is configured to enforce a security policy in order to provide better security to the LAN, limiting leakage of information from the LANs to the external resource and the ability to attack the LANs from an external resource (e.g. external networks). To this end, FW can operate one or more firewall applications and possibly other security measures, such as intrusion detection and prevention devices, anti-virus and spam filters.

Security manager SM is configured to provide additional security in accordance with the presently disclosed subject matter. As illustrated in FIG. 8 security manager SM can be implemented as an independent processing unit, which resides in the DMZ. In other cases security manger SM can be incorporated as an integral part of FW.

Firewall FW and security manager SM may be, but are not limited to, personal or portable computers, a server computer or any other apparatus having the appropriate processing power for running the required operations and equipped with proper communication facilities and computer memory (including non-transitory computer memory). In general, servers are often implemented as dedicated server-computers which are characterized by faster CPU, high performance RAM and possibly multiple hard drives and large storage space. Firewall FW and security manager SM are associated with at least one processor which is configured to manage and control relevant components and operations, and to perform tasks in response to instructions.

Figure 9:
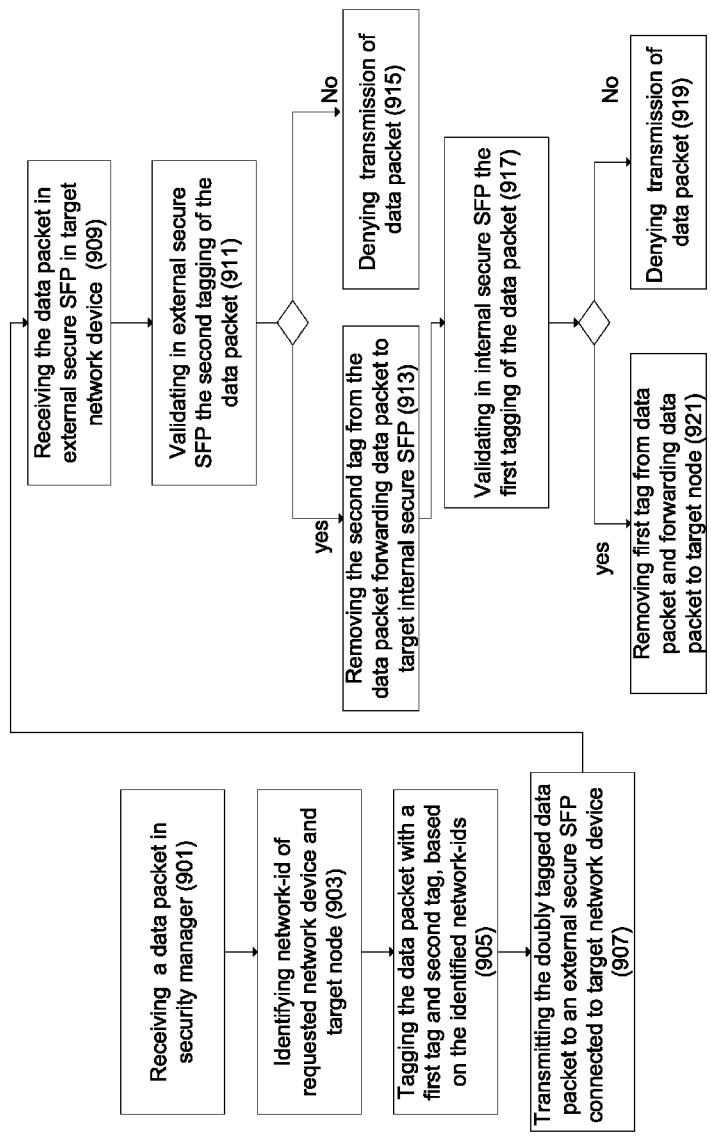
FIG. 9 is a flowchart illustrating operations performed in accordance with the presently disclosed subject matter.
Figure 10:
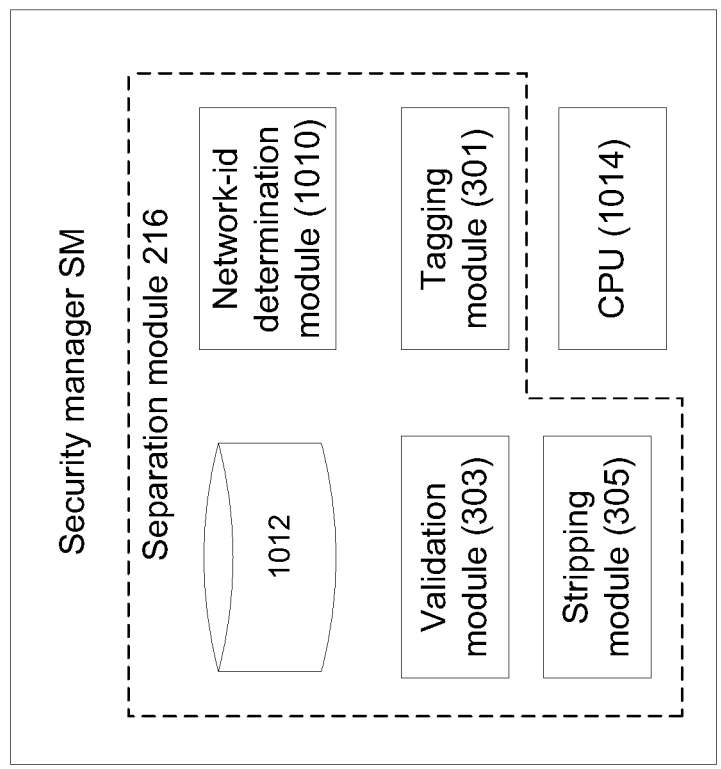
FIG. 10 is a functional block diagram schematically illustrating a security manager, in accordance with the presently disclosed subject matter.

FIG. 10 is a functional block diagram schematically illustrating a security manager SM, in accordance with the presently disclosed subject matter. SM can comprise separation module 216 or similar components including, tagging module 301, validation module 303 and stripping module 305. Security manager SM also comprises a network-id determination module 1010 and a data repository 1012 for storing addresses of different devices (e.g. nodes and network devices) in the network and their corresponding network-id. Security manager can also comprise a processing unit 1014. A more detailed description of the operations of the different modules in security manager is provided below with reference to FIG. 9.

FIG. 9 is a flowchart illustrating operations performed, in accordance with the presently disclosed subject matter. The operations in FIG. 9 are described with reference to the network architecture presented in FIG. 8.

At block 901 a data packet transmitted from a source external to LAN23 (e.g. the Internet) is received in security manager SM. The data packet is destined to a node in LAN23. Security manager SM utilizes the destination address of the target node, which is specified in the header of the data packet, to search in data-repository 1012 and locate the respective network-id assigned to the internal secure SFP which is connected to the requested target node. In a similar manner, security manager SM identifies the network-id which was assigned to an external secure SFP (ESFP) which connects security manger SM to router R23 (block 903). This can be accomplished with the help of network-id determination module 1010. Based on the identified network-ids, security manager SM tags the incoming data packet with a first tag (corresponding to target internal-secure-SFP) and a second tagging (corresponding to target external-secure-SFP) (block 905).

Optionally, SM can determine whether an incoming data packet destined to a certain target device is authorized to be sent to the requested target. This can be accomplished for example by FW. In case it is determine that the data packet can be forwarded to the requested target (e.g. it does not include malicious content), it can tag the data packet as explained above. Otherwise the transmission of the data can be denied.

The doubly tagged data packet is then transmitted by security manager SM to an external secure SFP connected to the target LAN, which is in the current example router R1 in LAN23 (block 907). The data packet is received in the external secure SFP (block 909) where the SFP determines whether the second tagging of the data packet is in agreement with the network-id which was assigned to the external secure SFP e.g. with the help of validation module 303 (block 911).

In cases where the validation shows that the second tagging of the incoming data packet is compatible with the network-id assigned to the external secure SFP, the second tagging is removed from the data packet and the data packet is transmitted to the target internal-secure-SFP which is the SFP connected to the target node (block 913). Removal of the tag can be accomplished with the help of stripping module 305 in the external SFP (ESFP). Otherwise, if the validation shows that the tagging of the incoming data packet is not compatible with the network-id assigned to the external secured SFP (ESFP) further transmission of the data packet is denied (block 915).

At block 917 the data packet, now tagged only with the first tag is received by the internal secure SFP (ISFP in FIG. 8) connected to the target node, where the first tag of the payload is validated e.g. with the help of validating module 303. In case the validation shows that tagging of the incoming data packet is compatible with the network-id assigned to the internal secure SFP (ISFP), the first tagging is removed from the data packet and the stripped data packet is transmitted to the target node (block 921). Otherwise, if the validation shows that the tagging of the incoming data packet is not compatible with the network-id assigned to the internal secure SFP, further transmission of the data packet is denied and the data packet is discarded (block 923).

This configuration of a DMZ can help to ensure that only data packets that passed through the DMZ (and FW in the DMZ) are allowed to be transmitted to the requested destination (in this case LAN23).

Figure 11:
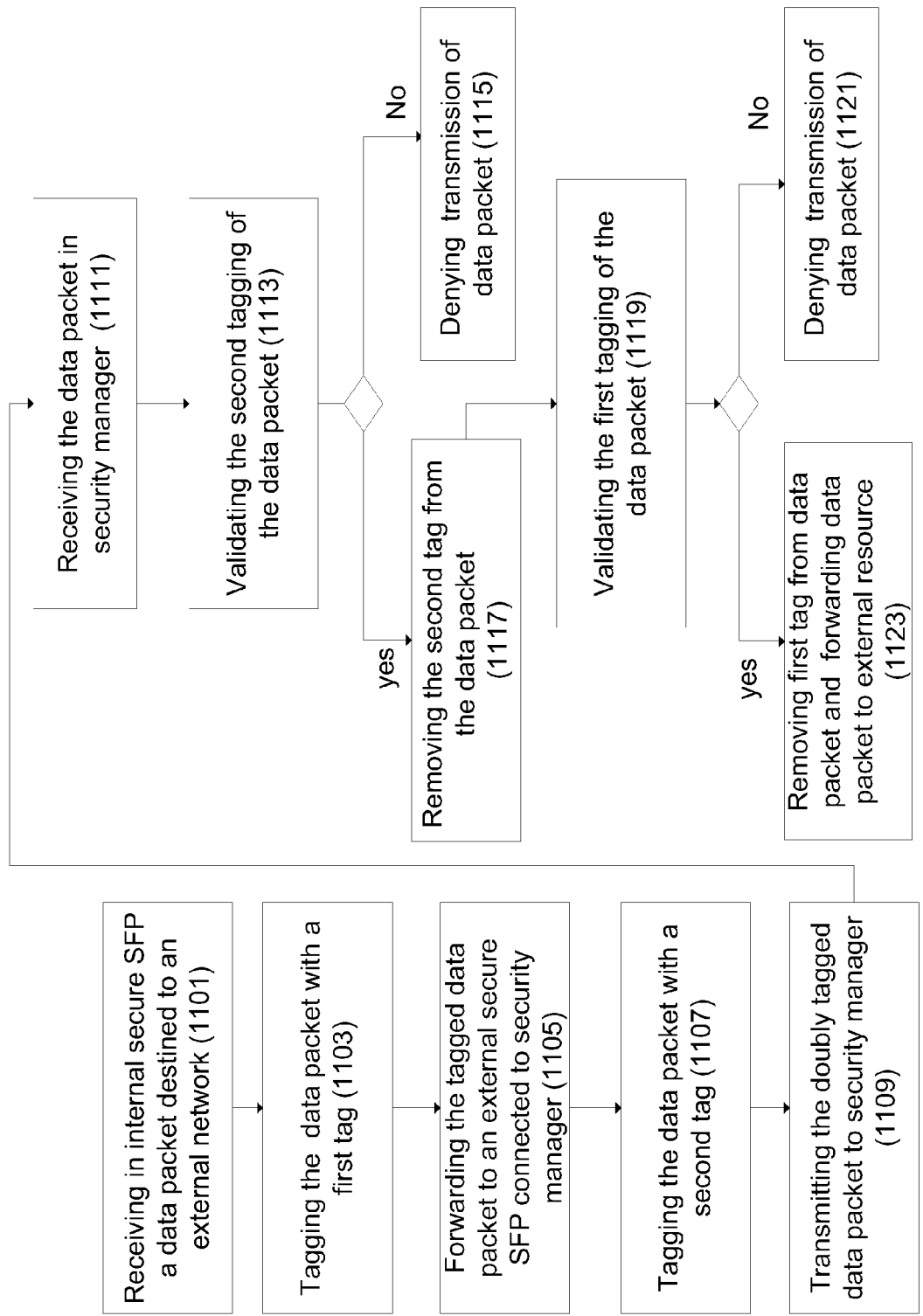
FIG. 11 is a flowchart illustrating operations performed in accordance with the presently disclosed subject matter.

FIG. 11 is a flowchart illustrating operations performed in accordance with the presently disclosed subject matter. The operations in FIG. 11 are described with reference to the network architecture presented in FIG. 8 and refer to transmission of data from LAN23 towards the external resource via security manager SM.

At block 1101 a data packet is transmitted from a node and received by the respective internal secure SFP in router R23. The uplinked data packet is processed by separation module 216 located in the internal secure SFP (e.g. ISFP) and the payload of the outgoing data packed is tagged based on the network-id assigned to the internal secure SFP 210 (block 1103).

As the data packet is destined to a node located outside of LAN23 (e.g. connected over the Internet), the data packet is transmitted from the internal secure SFP to an external secure SFP (ESFP in FIG. 8) which is connected to security manager SM in DMZ (block 1105).

As explained above with reference to FIG. 7 a tagged data packed which is received by an external secure SFP is tagged a second time with a second tagging by the external secure SFP (block 1107). The second tagging identifies the data packet as a data packet which was sent by an external SFP to an external resource. After the data is tagged for the second time, it is transmitted to security manager SM (block 1109).

The transmitted data block is received at security manager (block 1111) where the security manager is configured to validate the second tagging of the data packet e.g. with the help of validation module 303 (block 1113). To this end, network-id determination module 1010 is used to locate in data repository 1012, the network-id of the source external secure SFP (ESFP). The network-id is used by security manager SM to validate the second tagging of the payload.

In cases where it is determined that the second tagging of the payload of the incoming data packet is not compatible with the external network-id assigned to the source external secure SFP (ESFP), further transmission of the data packet is denied (block 1115). Otherwise, in cases where it is determined that the tagging of data packet is compatible with the external network-id of the source external secure SFP (ESFP), stripping module in security manager is configured to remove the second tagging from the data packet (block 1117).

At block 1119 security manager validates the first tagging of the data packet e.g. with the help of validation module 303. As before network-id determination module 1010 is used to locate in data repository 1012, the network-id of the source internal secure SFP. The network-id is used by security manager SM to validate the second tagging of the payload.

In cases where it is determined that the first tagging of the data packet is not compatible with the internal network-id assigned to the source external secure SFP, further transmission of the data packet is denied (block 1121). Otherwise, in case it is determined that the first tagging of the data packet is compatible with the internal network-id of the source external secure SFP (ISFP), the stripping module in the security manager is configured to remove the first tagging from the payload and forward the data packet to the external resource (block 1123).

For example, data repository 1012 can comprise data indicating whether data transmitted from a device (e.g. node or network device) associated with a certain network environment is allowed be transmitted to the external network connected to SM. Thus, validation performed by validation module 303 includes determining whether the first and second tag identify a devices in a network environment which are allowed to transmit data to the external network.

As explained above, in cases where a plurality of affiliated network environments are present, validation module 303 can be configured, during the validation stage (block 911 and block 917 in FIGS. 9 and 1113 and 1119 in FIG. 11), to determine whether tagging of the data packet is compatible with any one of the network-ids of the affiliated network environments, which are stored in data-repository 309. In cases where the tag of an incoming data packet is compatible with one of the network-ids stored in data repository 309 the communication of the data packet is allowed.

The mechanism described above with reference to FIG. 8 and FIG. 11, enables to enforce restrictions on data communication. For example, since network environment separation is maintained by tagging data packets based on a network-id which is embedded within the SFP port and is not based on an identity of a node enclosed in the data packet's header, a deliberate attempt to send data from an unauthorized node inside LAN23 to another node located outside LAN23 by altering the sender's address (i.e., a spoofing attack) would be intercepted by security monitor SM.

It will also be understood that the presently disclosed subject matter may be implemented in a suitably programmed computer. Likewise, the presently disclosed subject matter includes a computer program being readable by a computer for executing the method of the presently disclosed subject matter. The presently disclosed subject matter further contemplates a machine-readable memory tangibly embodying a program of instructions executable by the machine for executing the method of the presently disclosed subject matter. The machine-readable memory includes non-transitory machine-readable computer memory such as for example, CD-ROM, memory device, hard drive, etc.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A secure small form-factor pluggable transceiver (SFP) comprising a separation module operatively connectible to a network device, the separation module being configured to control data communication in the communication network, the separation module being assigned with a network-id associating the separation module with a given network environment;
    the separation module being further configured to: tag, based on the network-id, a payload of a data packet received by the network device to be forwarded in a first direction, in order to associate the data packet with the given network environment; and
    determine whether a payload of a data packet received by the network device to be forwarded in a second direction, is tagged with a tag compatible with the assigned network-id, and if it is, remove the tag from the payload of the data packet and allow transmission of the data packet.

2. The SFP according to claim 1, wherein the separation module is an internal separation module, wherein the first direction is an uplink direction towards the switching fabric of the network device and the second direction is a downlink direction away from the network device.

3. The SFP according to claim 1, wherein the separation module is an external separation module, wherein the first direction is a downlink direction away from the switching fabric of the network device and the second direction is an uplink direction towards the network device.

4. The SFP of claim 1, wherein the separation module comprises a direction determination module configured to adapt the separation module to match one of a first directionality or a second directionality, wherein in the first directionality the first direction is an uplink direction towards the network device and the second direction is a downlink direction away from the network device, and in the second directionality the first direction is a downlink direction away from the network device and the second direction is an uplink direction towards the network device.

5. The SFP according to claim 1, wherein the separation module is configured as a one time programming device.

6. The SFP according to claim 1, wherein the separation module is associated with a plurality of network-ids, each network-id assigned to a respective network environment; the separation module is further configured to determine whether a tag, associated with a payload of a data packet received by the network device from the second direction, is compatible with any one of the plurality of the network network-ids, and if it is, remove the tag from the payload of the data packet and allow transmission of the data packet.

7. The SFP according to claim 6, wherein the separation module comprises a data repository for storing the plurality of network-ids.

8. The SFP according to claim 1, wherein the separation module further comprises:
    a data-repository for storing the network-id and a processor associated with a tagging module configured to perform the tagging; and
    a validation module configured to determine whether the tag is compatible with the separation module.

9. A network device configured to control communication of data between nodes associated with one or more network environments; the network device comprising:
    at least a first separation module and a second separation module, the first separation module being operatively connected to a first node connected to the network device;
    the first separation module and the second separation module being each configured to operate as part of a a physical layer of the network device and being operatively connected to a respective switching fabric;
    the first separation module is configured to tag a payload of a data packet received from the first node, based on a network-id assigned to the first separation module, the tag being indicative of a respective network environment of the first node; and transmit the data packet towards the second separation module.

10. The network device according to claim 9, wherein the second separation module is operatively connected to a second node connected to the network device;
    the second separation module is configured to:
    receive the data packet;
    determine whether the payload of the data packet is tagged with a tag which is compatible with the second separation module; and
    if it is, remove the tag from the payload of the data packet and allow transmission of the data packet to the second node.

11. The network device according to claim 9, wherein the second separation module is an external separation module associated with an external communication network connecting the network device to a second network device;
    the external separation module is configured to:
    tag the payload of the data packet received from the first separation module, with a second tag, the second tag being indicative of a respective network environment of the network device; and transmit the data packet towards the second network device.

12. The network device according to claim 11, wherein the second external separation module is configured to:
    receive a data packet sent from a second node connected to the second network device; the data packet comprising a first tag and a second tag;
    determine whether the second tag, associated with the data packet, is compatible with the external separation module;
    if it is, remove the tag from the payload of the data packet;
    transmit the data packet to the separation module; the separation module is configured to:
    determine whether the first tag, associated with the data packet, is compatible with the separation module;

if it is, remove the tag from the data packet; and transmit the data packet to a node connected to the network device.

13. The SFP according to claim 1, wherein the separation module is incorporated in a security manager;

the security manager operatively connected to a network device and to an external network, and being operable to control transmission of data between the network device and the external network; the security manager comprises or otherwise associated with a data repository configured for storing network-ids;

the separation module is configured to:

receive a data packet, sent via an external separation module in the network device; the data packet comprising a first tag and a second tag;

determine whether the second tag, associated with the data packet, is compatible with any one of network-ids stored in the data repository;

if it is, remove the tag from the data packet; and determine whether the first tag, associated with the data packet, is compatible with any one of network-ids stored in the data repository;

if it is, remove the tag from the data packet; and allow the transmission of the data packet to the external network.

14. A method of controlling transmission of data in a communication network, the method comprising:

tagging, at a secure small form-factor pluggable transceiver payload of a data packet received by a network device to be forwarded in a first direction in the communication network; the tagging is performed by a separation module which is connected between a physical layer and a switching fabric of the network device and assigned based on a network-id to the network device; the network-id is indicative that the data packet is associated with a given network environment; and determining, at a secure small form-factor pluggable transceiver, whether a payload of a data packet, received by the network device to be forwarded in a second direction, is tagged with a tag compatible with a network-id assigned to a target device, and if it is, removing the tag from the payload of the data packet and allowing transmission of the data packet to the target device.

15. The method according to claim 14, wherein the first direction is an uplink direction towards the switching fabric of the network device and the second direction is a downlink direction away from the switching fabric of the network device.

16. The method according to claim 14, wherein the first direction is a downlink direction away from the switching fabric of the network device and the second direction is an uplink direction towards the switching fabric of the network device.

17. The method according to claim 14, wherein the network device is connected to a first node and a second node, the method comprising:

performing the tagging on a payload of a data packet received from a first node connected to the network device; and performing the determining on the data packet being transmitted to a second node connected to the network device, thereby controlling transmission of data between the first node and the second node.

18. The SFP according to claim 1, wherein the separation module is configured between a physical layer and a respective switching fabric in the network device such uplinked data and down-linked data passes through the separation module.

19. The SPF according to claim 1, wherein the tagging of the payload by the separation module, comprises encrypting the payload; and wherein determining whether the payload is tagged with a tag compatible with the assigned network-id, comprises decrypting the payload.

* * * * *